US009046233B2

(12) United States Patent
Chen

(10) Patent No.: US 9,046,233 B2
(45) Date of Patent: Jun. 2, 2015

(54) ASSEMBLAGE STRUCTURE FOR OLED LIGHTING MODULES

(75) Inventor: Chin-Shan Chen, Hsinchu (TW)

(73) Assignee: AU Optronics Corporation, Hsinchu (TW)

( * ) Notice: Subject to any disclaimer, the term of this patent is extended or adjusted under 35 U.S.C. 154(b) by 808 days.

(21) Appl. No.: 12/924,475

(22) Filed: Sep. 27, 2010

(65) Prior Publication Data

US 2012/0075871 A1 Mar. 29, 2012

(51) Int. Cl.

| | |
|---|---|
| ***B60Q 3/04*** | (2006.01) |
| ***F21V 15/00*** | (2006.01) |
| ***F21S 2/00*** | (2006.01) |
| ***F21V 21/005*** | (2006.01) |
| ***F21V 23/06*** | (2006.01) |
| *F21Y 105/00* | (2006.01) |

(52) U.S. Cl.

CPC ............ *F21S 2/005* (2013.01); *Y10T 29/49826* (2015.01); *F21V 21/005* (2013.01); *F21V 23/06* (2013.01); *F21Y 2105/008* (2013.01)

(58) Field of Classification Search

USPC ........................ 362/362, 97.1–97.4, 600–634

See application file for complete search history.

(56) References Cited

U.S. PATENT DOCUMENTS

| | | | | |
|---|---|---|---|---|
| 5,278,432 | A * | 1/1994 | Ignatius et al. | 257/88 |
| 6,565,231 | B1 | 5/2003 | Cok | |
| 6,693,296 | B1 * | 2/2004 | Tyan | 257/40 |
| 6,819,036 | B2 | 11/2004 | Cok | |
| 7,108,392 | B2 * | 9/2006 | Strip et al. | 362/145 |
| 7,527,716 | B2 * | 5/2009 | Harding | 204/403.02 |
| 7,625,104 | B2 * | 12/2009 | Zhang et al. | 362/294 |
| 8,362,715 | B2 | 1/2013 | Snijder et al. | |
| 2005/0236981 | A1 * | 10/2005 | Cok et al. | 313/504 |
| 2008/0037284 | A1 * | 2/2008 | Rudisill | 362/629 |
| 2008/0297072 | A1 | 12/2008 | Snijder et al. | |

FOREIGN PATENT DOCUMENTS

| | | |
|---|---|---|
| CN | 101331356 | 12/2008 |
| DE | 102005027371 | 12/2006 |

OTHER PUBLICATIONS

English language abstract of DE102005027371 (1 page).
European Patent Office Search Report dated Apr. 26, 2013 (7 pages).

* cited by examiner

*Primary Examiner* — Stephen F Husar
*Assistant Examiner* — Danielle Allen
(74) *Attorney, Agent, or Firm* — Ware, Fressola, Maguire & Barber LLP

(57) ABSTRACT

A lighting module has an OLED panel with two or more pairs of electrodes and a casing for mounting the OLED panel on the casing front side. The backside of the casing has two openings for providing access to one pair of electrodes (anode and cathode), each opening located near one of the opposing side edges to provide access to one of the electrodes. A connection component made of an electrically conductive material has two bent portions dimensioned for inserting into the openings of two adjacent lighting modules for providing mechanical and electrical connection between two adjacent modules. The length of the connection component is dimensioned for achieving a snug fit between two adjacent modules. One lighting module can be connected to one or two adjacent lighting modules in a one-dimensional array, or two to fourth adjacent lighting modules in a two-dimensional array.

20 Claims, 11 Drawing Sheets

ASSEMBLAGE STRUCTURE FOR OLED LIGHTING MODULES

FIELD OF THE INVENTION

The present invention relates generally to an OLED lighting module and, more particularly, to a connecting structure for mechanically and electrically linking one module to another.

BACKGROUND OF THE INVENTION

It is known that organic light-emitting diodes (OLEDs) are made by depositing organic semiconductor materials between two electrodes on a substrate. When powered by an electric current via the electrodes, OLEDs can be used as a light source with an extended lighting surface. Nevertheless, lighting devices made of OLEDs are generally limited in sizes and light output. It is thus desirable to group together a number of OLED lighting units into an assembly so as to increase the light emitting surface. The present invention provides a method and device for grouping two or more OLED lighting units for extending the lighting surface.

SUMMARY OF THE INVENTION

The present invention provides an OLED lighting module that can be electrically and mechanically connected to one or more adjacent lighting modules in a one-dimensional array or in a two-dimensional array. The lighting module can be rectangular, hexagonal or in other shapes.

Thus, the first aspect of the present invention is an OLED lighting module having an organic light-emitting diode (OLED) panel with at least one pair of electrodes and a casing for mounting the OLED panel on the front side of the casing.

In one embodiment of the present invention, the backside of the casing has two openings for providing access to one pair of electrodes (anode and cathode), each opening located near one of the opposing side edges to provide access to one of the electrodes. As such, one OLED lighting module can be connected to one or two adjacent OLED lighting modules using one or two connection components made of an electrically conductive material. Each connection component has two bent portions dimensioned for inserting into the openings of two adjacent OLED lighting modules for providing electrical connection between the two adjacent modules. The length of the connection component is dimensioned for achieving a snug fit between two adjacent lighting modules.

In a different embodiment of the present invention, the OLED panel has two pairs of electrodes and the backside of the casing has four openings located near the four sides of the casing to provide access to the two pairs of electrodes. As such, one OLED lighting module can be electrically connected to two or more adjacent lighting modules in two directions.

The second aspect of the present invention is a lighting assembly formed by a plurality of OLED lighting modules using one or more connection components to provide electrical and mechanical connection between adjacent OLED lighting modules. The light assembly can be a linear array of OLED lighting modules or a two-dimensional array. In a two-dimensional array, each OLED lighting module can be connected up to four adjacent modules if the lighting modules are rectangular in shape. If the lighting modules are hexagonal, each module can be connected up to six adjacent modules. Mechanical engaging members such as mortises and tenons are provided on the side edges of the OLED lighting modules for providing additional mechanical supports when the modules are connected together.

The third aspect of the present invention is a method for assembling a plurality of OLED lighting modules into a larger unit. The method comprises the steps of arranging the electrodes in the OLED lighting panel and the openings in the casing near the edges of the casing, and providing one or more connection components in order to electrically and mechanically connect one adjacent OLED lighting module to another.

The present invention will become apparent upon reading the description taken in conjunction with FIG. 1*a* to FIG. 16.

BRIEF DESCRIPTION OF THE DRAWINGS

FIGS. 14*a*-16 show various OLED lighting modules and the associated connection components, according to various embodiments of the present invention.

DETAILED DESCRIPTION OF THE DISCLOSURE

The present invention uses a connection component to link two organic light-emitting diode (OLED) lighting modules, not only mechanically but also electrically. That is, the connection component allows two OLED lighting modules to be linked together side-by-side in an easy snap-on fashion. The connection component is made of an electrically conductive material, such as copper and aluminum, so that electrical current from one OLED lighting module can flow through the other module for powering the OLEDs in both of the connected modules. In a linear array of OLED lighting modules connected in series, such as one shown in FIG. 7, electrical power can be provided to two ends of the linear array, and electric current can flow through the interconnecting connection components.

Figure 1B:
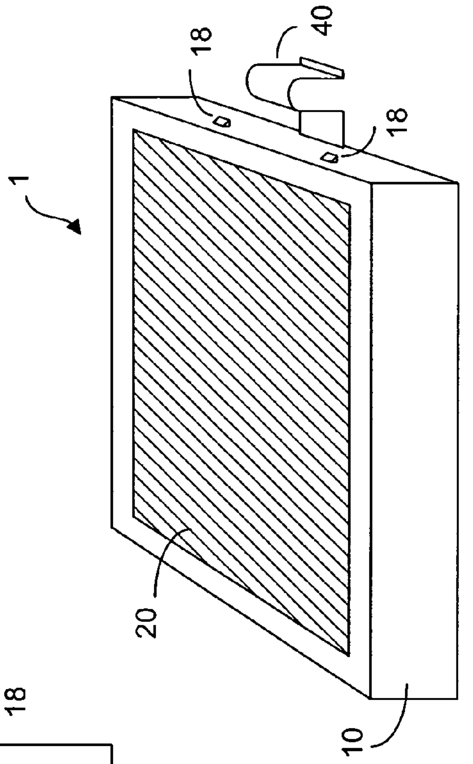
FIG. 1*b* shows a perspective view of the OLED lighting module of FIG. 1*a*.
Figure 1A:
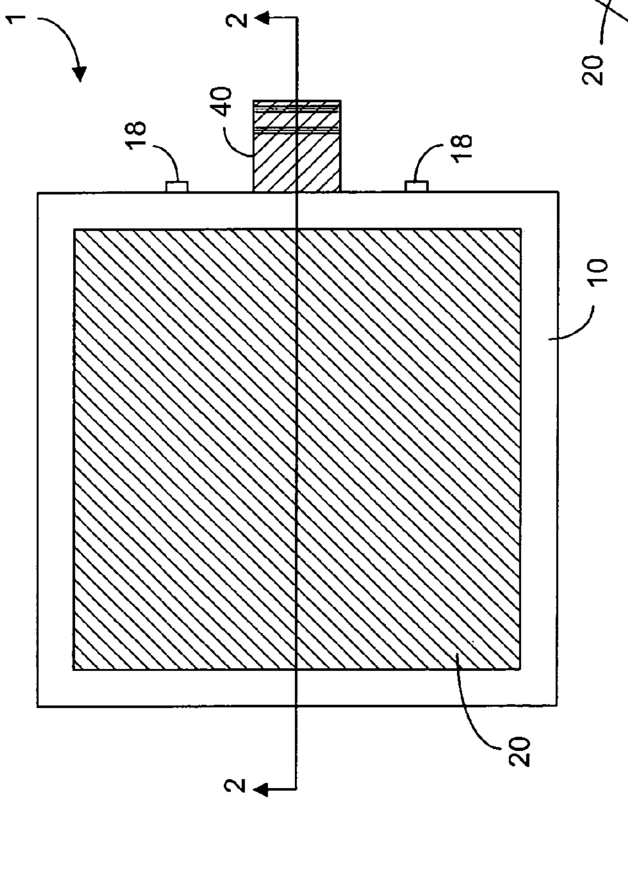
FIG. 1*a* shows a top view of an OLED lighting module, according to one embodiment of the present invention.
Figure 3:
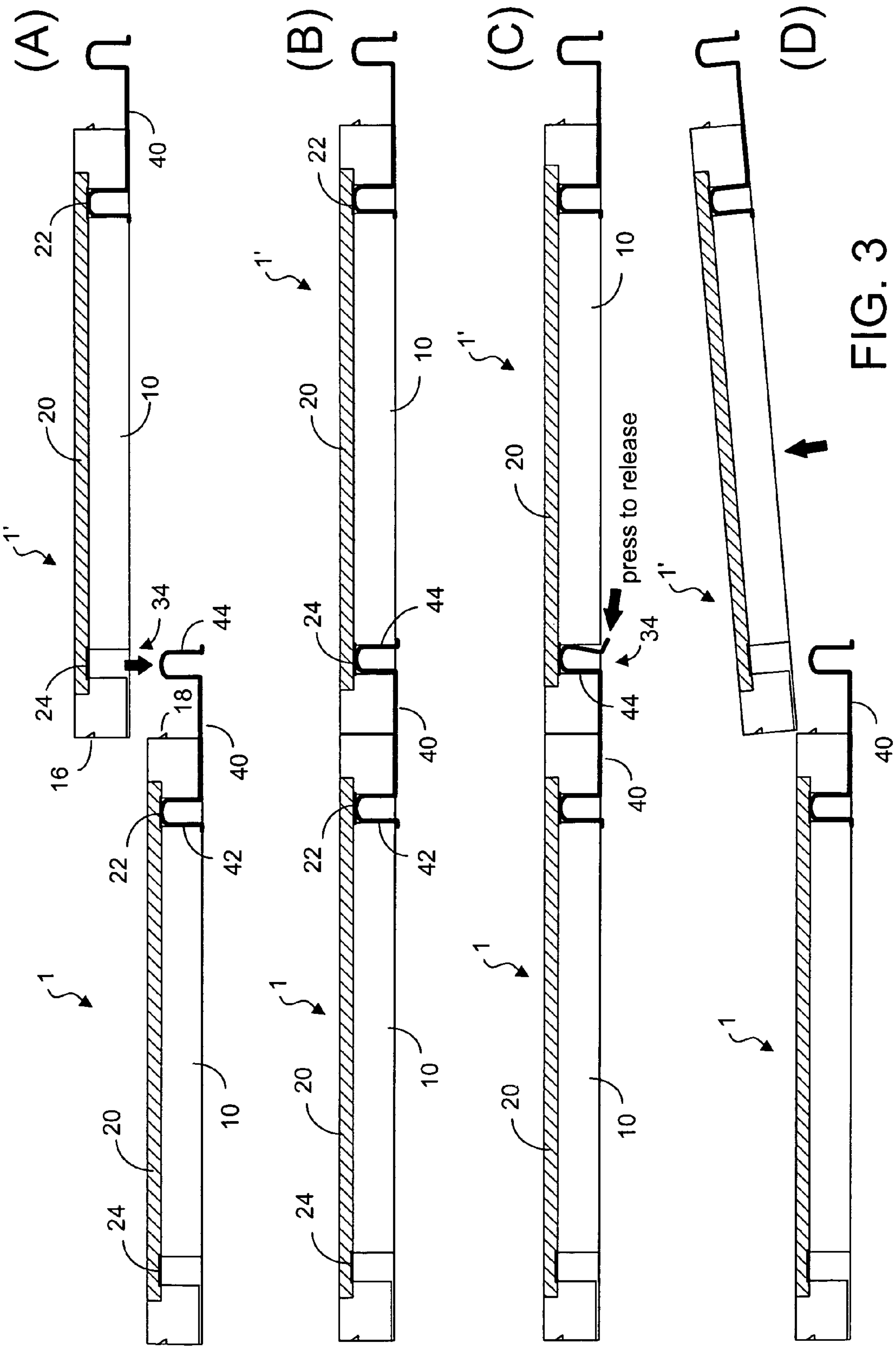
FIGS. 3*a*-3*d* show how two OLED lighting modules are connected and disconnected.

As shown in FIGS. 1*a* and 1*b*, the OLED lighting module 1, according to one embodiment of the present invention, comprises an OLED panel 20 and a casing 10 for mounting the OLED panel 20 on the top surface of the module 1. A connection component 40 is used for mechanically and electrically connecting the OLED lighting module to another OLED lighting module (see FIGS. 3*a*-3*d* and 4, for example). The casing 10 comprises a plurality of tenons 18 to be inserted into matching mortises of another OLED lighting module (see FIG. 3*a*). The tenons and mortises are used for aiding the alignment between two connected OLED lighting modules and for providing additional mechanical support.

Figure 2:
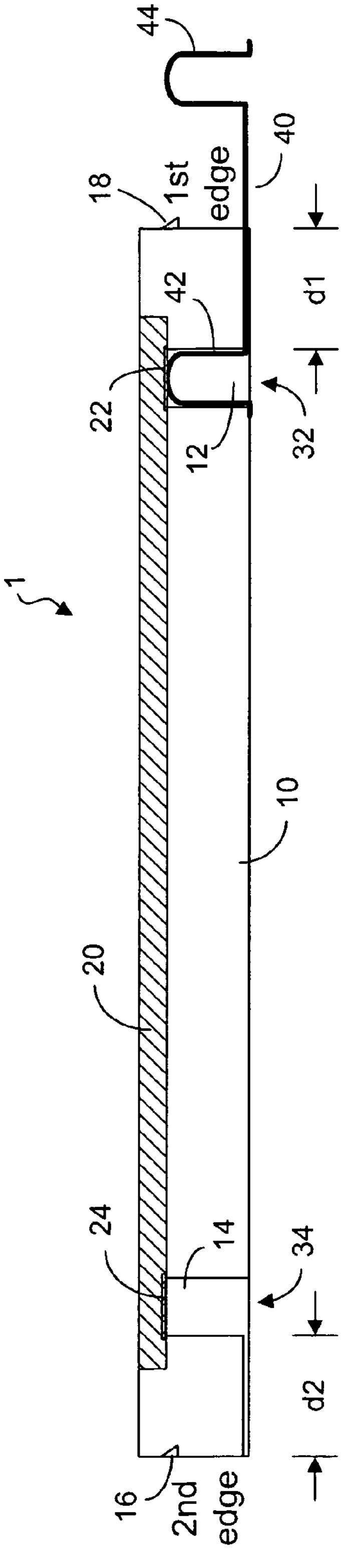
FIG. 2 shows a cross-sectional view of the OLED lighting module of FIG. 1*a*.

As shown in the cross-sectional view of FIG. 2, the OLED lighting module 1 comprises a first electrode 22 and a second electrode 24 electrically connected to the OLED panel 20 for powering the OLED lighting module. One of the electrodes serves as a cathode and the other serves as an anode. In one embodiment of the present invention, the electrode 22 is a cathode and the electrode 24 is an anode. In another embodiment of the present invention, the electrode 22 is an anode and the electrode 24 is a cathode. The casing 10 has two openings 12 and 14 on the bottom surface of the module 1 for providing accesses to the electrodes 22 and 24. The opening 12 and the electrode 22 effectively form a receptacle 32. The opening 14 and the electrode 24 effectively form a receptacle 34. The connection component 40 can be made from a sheet of resilient metal or alloy. The connection component 40 has two bent portions 42 and 44 dimensioned to be inserted into the receptacles 32 and 34. As shown in FIG. 2, the bent portion 42 of the connecting component is inserted into the receptacle 32 so that the connection component 40 is in electrical contact with the electrode 22. As shown in FIG. 2, the casing 10 also has a plurality of mortises 16 made on the second end of the lighting module and a plurality of tenons 18 provided on the first end of the lighting module.

When two OLED lighting modules are connected together, the bent portion 44 of one OLED lighting module is inserted into the receptacle 34 of another OLED lighting module as shown in FIGS. 3*a* and 3*b*. When two OLED lighting modules are properly connected, as shown in FIG. 3*b*, the connection component 40 provides both the mechanical connection and the electrical connection between the connected OLED lighting modules 1 and 1'. As the bent portion 42 is in electrical contact with electrode 22 of the OLED lighting module 1 and the bent portion 44 is in electrical contact with electrode 24 of the OLED lighting module 1', the electrode 22 of the OLED lighting module 1 is electrically connected to the electrode 24 of the OLED lighting module 1'. To power both the OLED panel 20 in the module 1 and the OLED panel 20 in the module 1', electrical power is provided through the electrode 24 of the module 1 and the electrode 22 of the module 1', forming a current loop. The connection component 40, according to the present invention, provides an easy connection between two OLED lighting modules in a snap-on fashion. Preferably, the connection component 40 is made of a resilient metal sheet so that the bent portions 42, 44 can be easily inserted into the receptacles 32 and 34 while providing a good mechanical support. Like a spring, the bent portions can be temporarily distorted but the urging force of the bent portions would help secure the engagement of the connection component with the OLED lighting modules. As shown in FIG. 3*c*, one can press the tip of the connection component 40 to release the grip of the bent portion 44 on the receptacle 34 of the OLED lighting module 1'. As such, the OLED lighting module 1' can be disconnected from the OLED lighting module 1, as illustrated in FIG. 3*d*.

Figure 4:
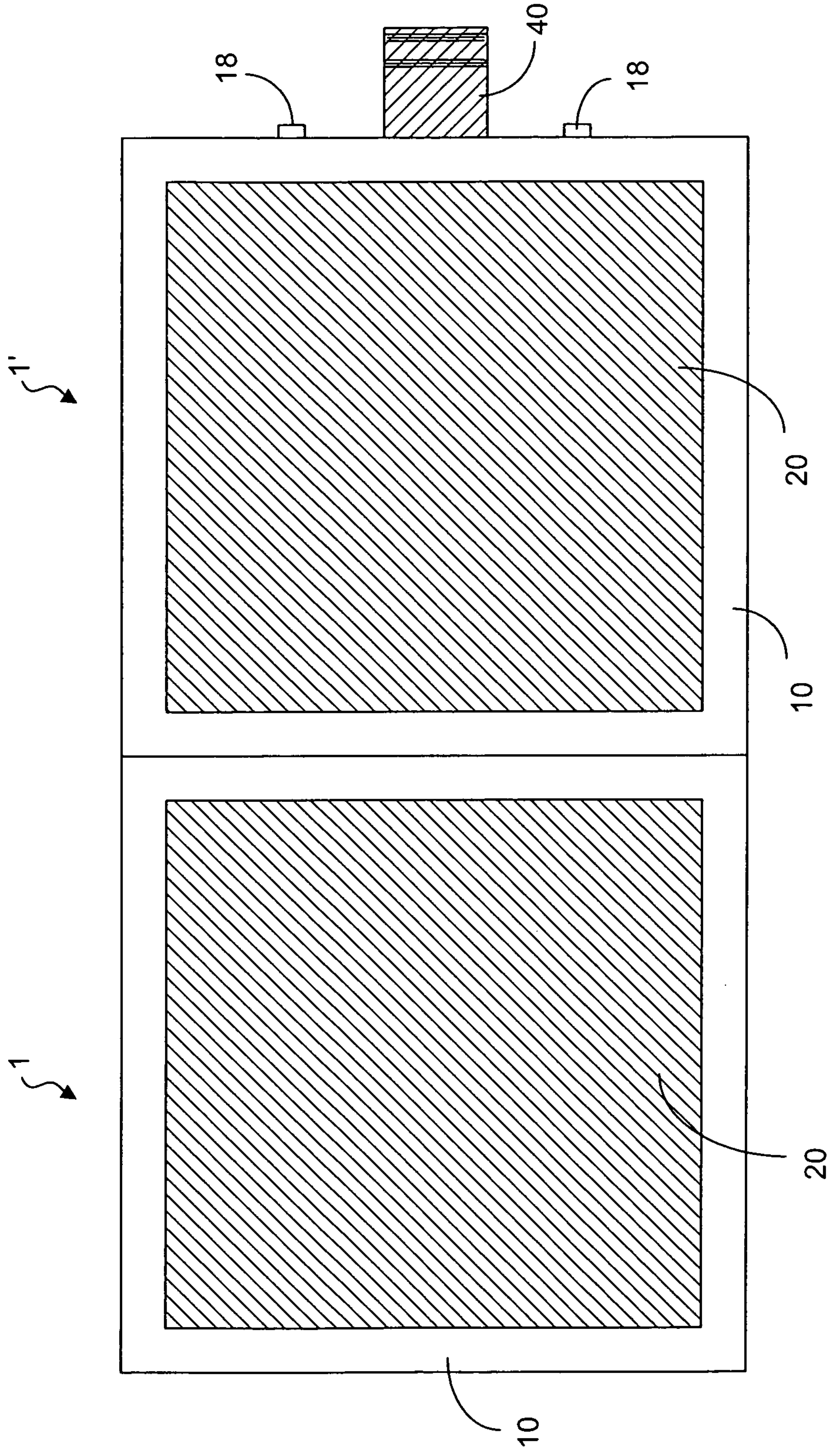
FIG. 4 shows two connected OLED lighting modules, according to one embodiment of the present invention.
Figure 7:
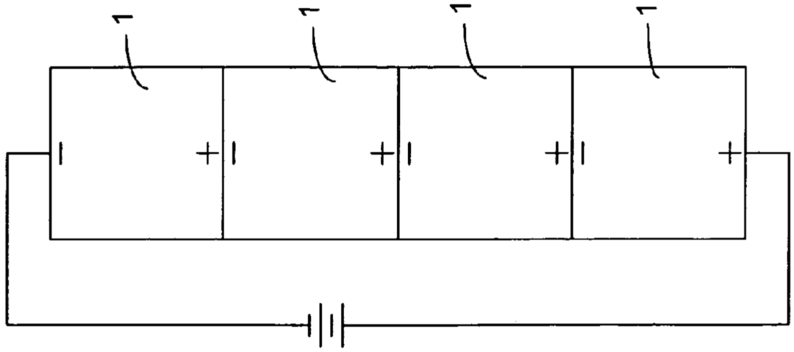
FIG. 7 shows a series of OLED lighting modules connected together in a one-dimensional array.

When two OLED lighting modules 1 and 1' are connected together, the tenons and mortises and the connection component 40 provide the mechanical alignment and support between the modules. As shown in FIG. 4, the connected OLED lighting modules 1 and 1' effectively function like a rectangular lighting device with an extended lighting surface. With a pair of receptacles 32 and 34, each OLED lighting module can be connected to two adjacent lighting modules, forming a linear array of modules as shown in FIG. 7. Electrical power is provided only to the two end modules in the series.

It should be noted that, as shown in FIG. 2, the distance d1 between the opening 12 and the first edge of the casing 10 and the distance d2 between the opening 14 and the second edge of the casing 10 are substantially the same. However, d1 can be different from d2. In order to achieve a snug fit between adjacent OLED lighting modules 1, 1', the length of the straight portion of the connection component 40 (between the bent portion 42 and the bent portion 44) is substantially equal to the sum of the distances d1 and d2.

Figure 5A:
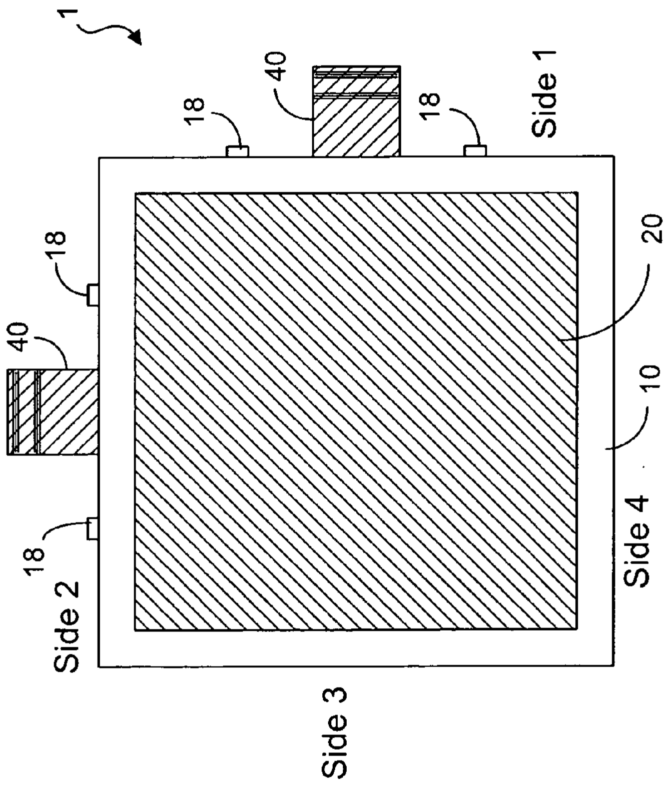
FIG. 5*a* shows an OLED lighting module, according to another embodiment of the present invention.
Figure 6:
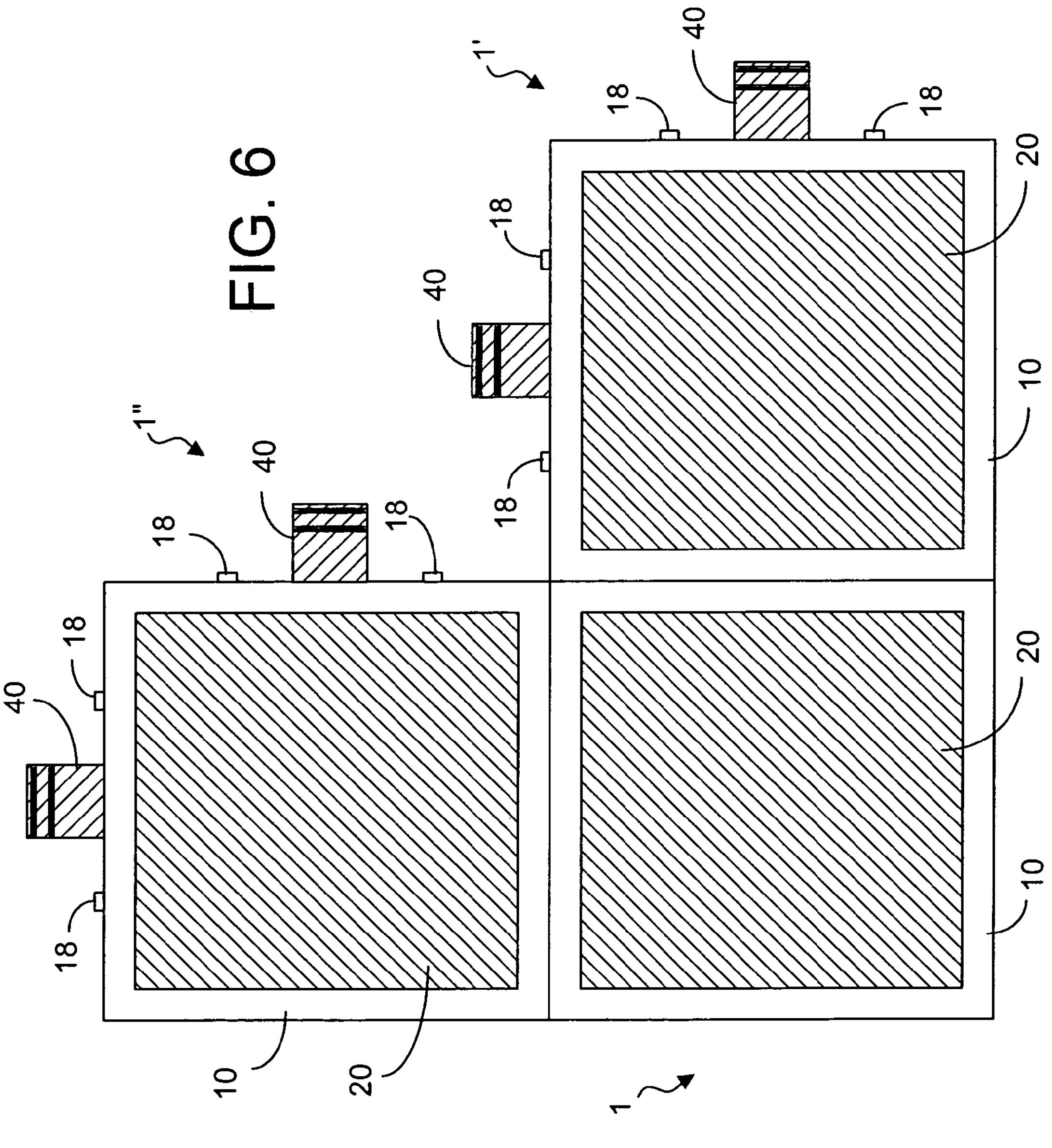
FIG. 6 shows three connected OLED lighting modules, according to one embodiment of the present invention.

In a different embodiment of the present invention, the OLED lighting module 1 comprises two connection components located on two adjacent sides of the casing 10. As shown in FIG. 5*a*, a first pair of tenons 18 and a first connection component 40 are located on Side 1 of the OLED lighting module 1, and a second pair of tenons 18 and a second connection component 40 are located on Side 2. It is understood that a pair of mortises and a receptacle are provided on Side 3 (not shown), and other pair of mortises and another receptacle are provided on Side 4 (not shown). As such, the OLED lighting modules can be connected to extend the lighting surface in two directions as shown in FIG. 6. As shown in FIG. 6, the OLED lighting module 1 and the OLED module 1' are mechanically and electrically connected by a connection component 40 via their receptacles 32, 34 (not shown) and the OLED lighting module 1 and the OLED module 1" are mechanically and electrically connected by a connection component 40 via their receptacles 32, 34 (not shown). With two pairs of receptacles, one OLED lighting module can be connected to four adjacent OLED modules.

When the casing 10 is rectangular in shape and the OLED lighting module 1 is configured for connection to other lighting modules in two directions (see FIG. 6), the backside of the casing 10 has four openings near the four side edges of the casing. Those side edges include a first pair of opposing side edges (side 1 and side 3) and a second pair of opposing side edges (side 2 and side 4). The organic lighting panel also has a third electrode 22' and a fourth electrode 24' in addition to the first electrode 22 and the second electrode 24. As shown in FIG. 5*c*, a first opening 12 is adjacent to and spaced from the first side edge (side 1) to provide access to the first electrode 22; the second opening 14 is adjacent to and spaced from the second side edge (side 3) to provide access to the second electrode 22; a third opening 12' adjacent to and spaced from the third side edge (side 2) to provide access to the third electrode 22' and a fourth opening 14' adjacent to and spaced from the fourth side edge (side 4) to provide access to the fourth electrode 24'. As such, one OLED lighting module can be electrically and mechanically connected to two to four adjacent lighting modules by using two to four connection components (see FIG. 8*c*).

Figure 5B:
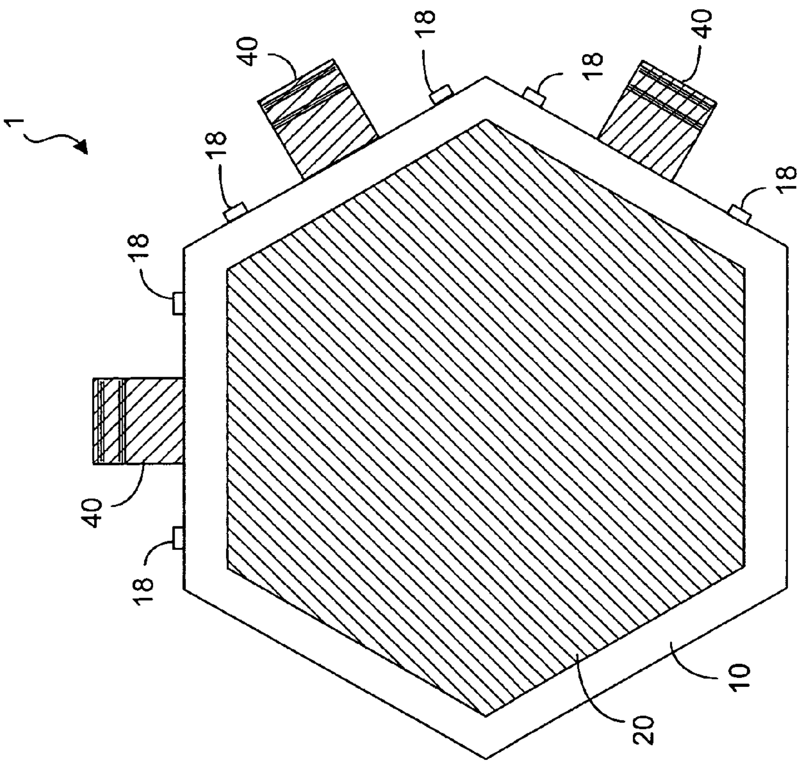
FIG. 5*b* shows an OLED lighting module, according to yet another embodiment of the present invention.
Figure 5C:
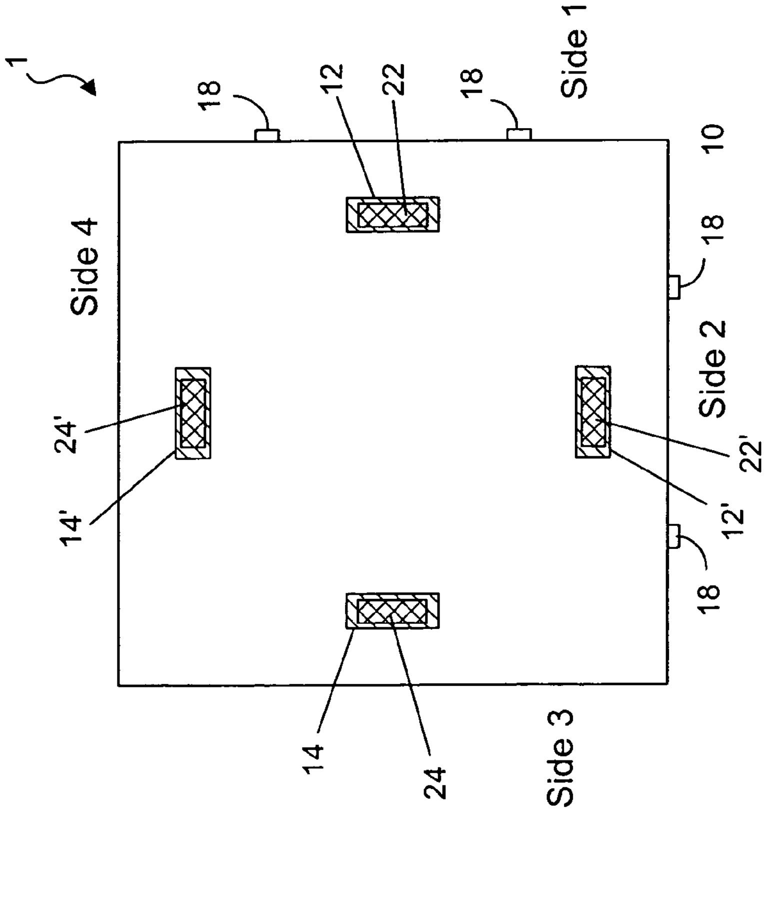
FIG. 5*c* shows the backside of the OLED lighting module of FIG. 5*a* without the connection component.

In yet another embodiment of the present invention, the casing is hexagonal such that three connection components can be provided for each OLED lighting module, as shown in FIG. 5*b*.

Figure 8C:
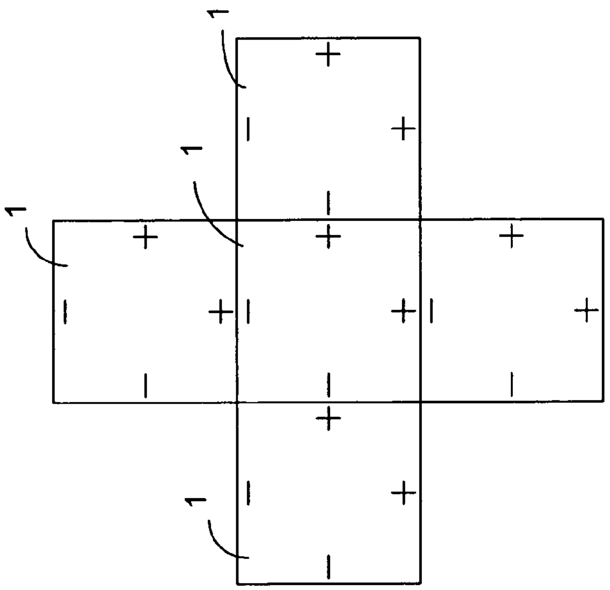
FIG. 8*c* shows a rectangular OLED lighting module connected to four adjacent lighting modules.
Figure 9:
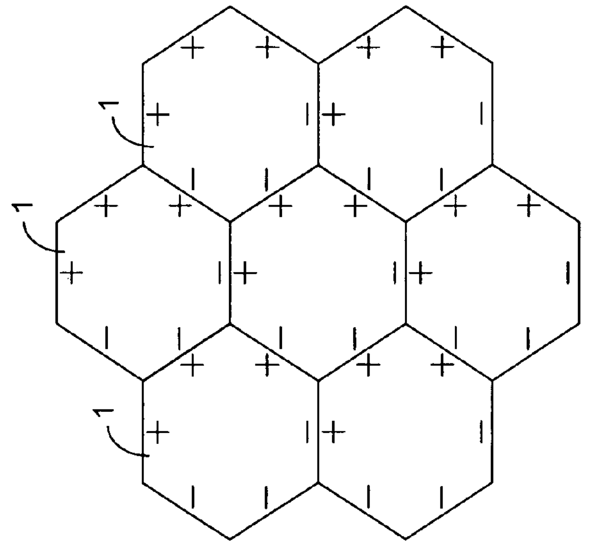
FIG. 9 shows a plurality of the OLED lighting modules connected together in a two-dimensional array, according to yet another embodiment of the present invention.
Figure 8A:
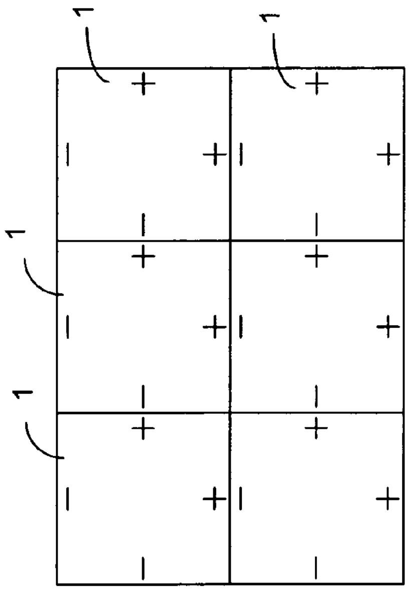
FIG. 8*a* shows a plurality of the OLED lighting modules connected together in a two-dimensional array, according to one embodiment of the present invention.
Figure 8B:
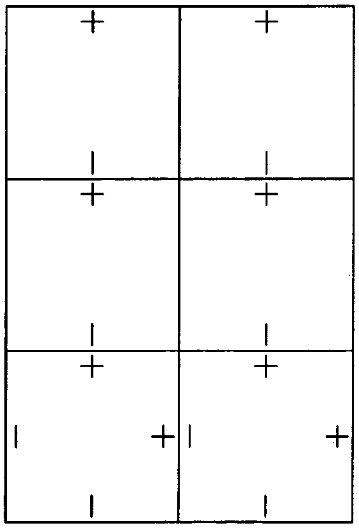
FIG. 8*b* shows a plurality of the OLED lighting modules connected together in a two-dimensional array, according to another embodiment of the present invention.

With receptacles 32, 34 (represented by "+" and "−"), the OLED lighting modules, according to various embodiments of the present invention, can be connected to form a larger lighting surface. For example, the OLED lighting module as shown in FIG. 1*a* can be used to form a linear array as shown in FIG. 7. The OLED lighting module as shown in FIG. 5*a* can be used to form a two dimensional array as shown in FIG. 8*a*. The combination of OLED lighting modules of different embodiments can be used to form a two dimensional array as shown in FIG. 8*b*. To use all the openings in the case, one OLED lighting module can be connected to four adjacent lighting modules as shown in FIG. 8*c*. The hexagonal module as shown in FIG. 5*b* can be used to form a honeycomb arrangement as shown in FIG. 9.

Figure 10:
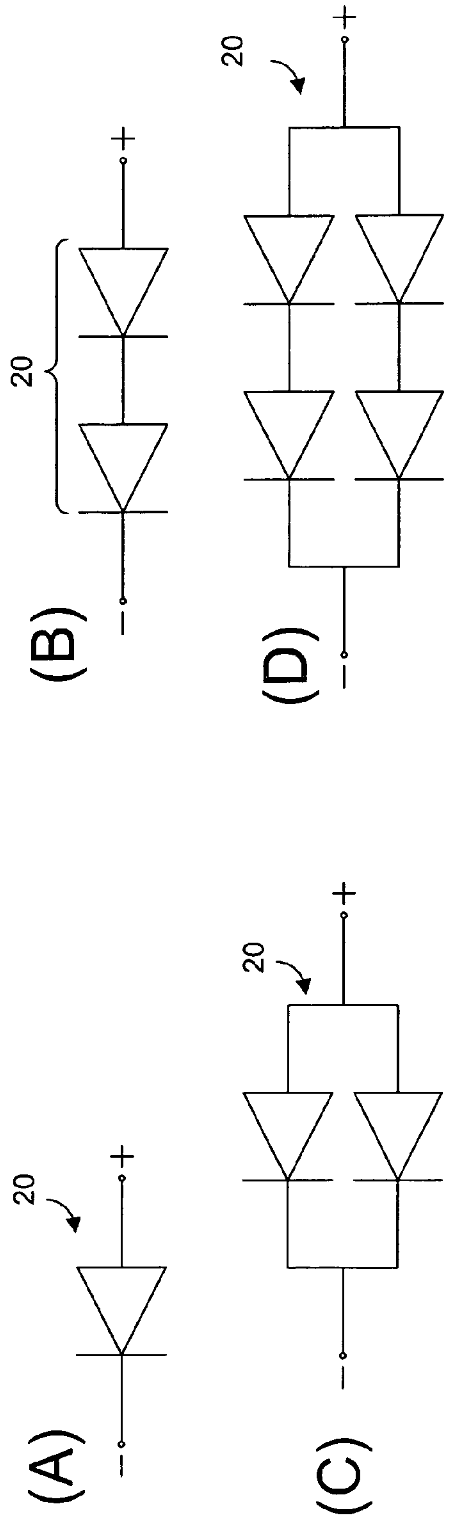
FIGS. 10*a*-10*d* show different arrangements of the OLED lighting segments within an OLED lighting device.

It should be understood that a single OLED lighting module 1 may comprise one, two or more OLED lighting panels or surface segments. For example, the OLED lighting module 1 may comprise a single OLED panel 20 as shown in FIG. 2 and represented by FIG. 10*a*. The OLED lighting module may comprise two OLED panels or segments connected in series as shown in FIG. 10*b*. The OLED lighting module may comprise two OLED panels or segments connected in parallel as shown in FIG. 10*c*. The OLED lighting module may comprise three or more OLED panels or segments connected in parallel and in series as shown in FIG. 10*d*.

In summary, as can be seen in FIGS. 1*a* to 9, the present invention provides an OLED lighting module 1 that includes an organic light-emitting diode lighting panel 20 having a first electrode 22 and a second electrode 24; a casing 10 having an upper surface configured for mounting the organic light-emitting diode panel, and a bottom surface having a first opening 12 for providing access to the first electrode 22 and a second opening 14 for providing access to the second electrode 24; and a connection component 40 made of an electrically conductive material, the connection component 40 has a first bent portion 42 and a second bent portion 44, the first bent portion 42 dimensioned for inserting into the first opening 12 to make electrical contact to the first electrode 22.

As such, the OLED lighting module 1 can be connected to another similarly constructed lighting module by inserting the second bent portion 44 into the second opening 14 of the other lighting module to make electrical contact to the second electrode 24 of the other lighting module. The OLED lighting module 1 can also be connected to a second similarly constructed lighting module using another connection component 40.

According to the present invention, the casing can be shaped differently. It can be rectangular as shown in FIG. 5*a* or hexagonal as shown in FIG. 5*b*. As such, the casing can have a plurality of edges between the upper surface and the bottom surface. Those edges include a first pair of edges including a first side edge (side 1) and an opposing second side edge (side 3); and a second pair of edges including a third side edge (side 2) and an opposing fourth side edge (side 4). The organic light-emitting diode panel can have a first pair of electrodes 22, 24 and a second pair of electrodes 22', 24'. On the backside of the casing, a first opening 12 is located near the first side edge (side 1) to provide access to the first electrode 22; a second opening 14 is located near the second side edge (side 3) to provide access to the second electrode 24; a third opening is located near the third side edge (side 2) to provide access to the third electrode 22'; and a fourth opening 14' is located near the fourth side edge (side 4) to provide access to the fourth electrode 24'. As such, the OLED lighting module 1 can have two connection components 40 (see FIG. 5*a*) so that it be connected to two similarly constructed lighting modules in two directions by using two connection components 40 as shown in FIG. 6.

In various embodiments of the present invention, the electrodes 22, 24 form a pair of anode and cathode for providing electrical current to the organic light-emitting diode lighting panel.

The present invention also provides a lighting assembly formed by a plurality of a plurality of lighting modules, each lighting module comprising an organic light-emitting diode lighting panel comprising a first electrode and a second electrode, and a casing comprising a first surface and an opposing second surface, the first surface configured for mounting the organic light-emitting diode panel, the second surface comprising a first opening for providing access to the first electrode and a second opening for providing access to the second electrode, wherein said plurality of lighting modules comprise a first lighting module and an adjacent second lighting module. In order to connect one lighting module to another, a connection component made of an electrically conductive material is used. The connection component has a first bent portion and a second bent portion, the first bent portion dimensioned for inserting into the first opening of the first lighting module to make electrical contact to the first electrode in the first lighting module, the second bent portion dimensioned for inserting into the second opening of the second lighting module to make electrical contact to the second electrode in the second lighting module.

In order to add mechanical supports to the lighting assembly, the casing includes a plurality of engaging members for mechanically coupling the first side edge of the first lighting module to the second side edge of the second lighting module. The engaging members comprise mortises and matching tenons.

The lighting assembly can have a third lighting module connected to the first lighting module, forming a linear array. Alternatively, the light assembly can be a two-dimensional array as shown in FIGS. 6, 8*a*, 8*b*, 8*c* and 9. In that case, the OLED lighting module would have four openings and two pairs of electrodes as shown in FIG. 8*c*.

Thus, the present invention provides a method for assembling a plurality of lighting modules, each lighting module comprising an organic light-emitting diode lighting panel comprising a first electrode and a second electrode; and a casing comprising a first surface, an opposing second surface and a plurality of edges between the first surface and the second surface, the plurality of edges comprise a first side edge and an opposing second side edge, the first surface configured for mounting the organic light-emitting diode panel, the second surface comprising a first opening for providing access to the first electrode and a second opening for providing access to the second electrode, wherein said plurality of lighting modules comprise one or more adjacent lighting module pairs, each lighting module pair comprising a first lighting module and an adjacent second lighting module. The assembling method comprises:

locating the first opening adjacent to and spaced from the first side edge;

locating the second opening adjacent to and spaced from the second side edge; and providing a plurality of connection components made of an electrically conductive material, each connection component comprising a first bent portion and a second bent portion, the first bent portion dimensioned for inserting into the first opening of the first lighting module to make electrical contact to the first electrode in the first lighting module and the second bent portion dimensioned for inserting into the second opening of the second lighting module to make electrical contact to the second electrode in the second lighting module.

When the plurality of lighting modules are arranged in a two-dimensional array along a first axis and a second axis, the one or more adjacent lighting module pairs are arranged along the first axis and the first opening and the second opening are also arranged along the first axis. In each lighting module: the organic light-emitting diode lighting panel further comprises a third electrode and a fourth electrode; and the plurality of edges in the casing further comprises a third side edge and an opposing fourth side edge different from the first and second side edges, and the second surface of the casing further comprises a third opening for providing access to the third electrode and a fourth opening for providing access to the fourth electrode. The assembling method further comprising:

locating the third opening adjacent to and spaced from the third side edge;

locating the fourth opening adjacent to and spaced from the fourth side edge such that the third opening and the fourth opening are arranged in the second axis; and providing a plurality of further connection components made of an electrically conductive material, each further connection component comprising a first bent portion and a second bent portion, the first bent portion dimensioned for inserting into the third opening of one of the lighting modules in the two dimensional array to make electrical contact of the first electrode in said one of the lighting modules in the two-dimensional array, the second bent portion dimensioned for inserting into the fourth opening of another one of the lighting modules in the two-dimensional array to make electrical contact to the fourth electrode in said another one of the lighting modules in the two-dimensional array, wherein said one of the lighting modules is located adjacent to said another one of the lighting modules in the second axis.

In various embodiments of the present invention, the connection component is made of an electrically conductive material. The electrically conductive material is also sufficient sturdy and resilient to provide mechanical supports to the lighting assembly.

It should be understood by those skilled in the art, the OLED lighting module and the associated connection component can have different shapes and structures. As shown in the cross-sectional view of FIG. 11, the OLED lighting module 1 is similar to the embodiment as shown in FIG. 2 except that the shape of the openings 12 and 14 is different. Instead of having a straight opening as shown in FIG. 2, the openings 12 and 14 have an inward extension to accommodate a different connection component 40. As shown in FIG. 12, the connection component 40 has two different bent portions 42, 44. Each of the bent portions 42, 44 as shown in FIG. 12 is similar to an inverter L to be lodged into the inward extension portion of the openings 12, 14 as shown in FIG. 11.

Figure 11:
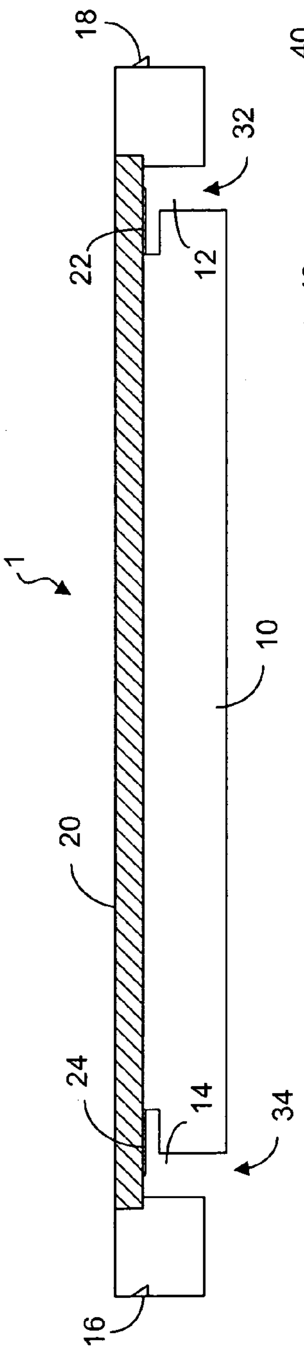
FIG. 11 shows an OLED lighting module, according to a different embodiment of the present invention.
Figure 12:
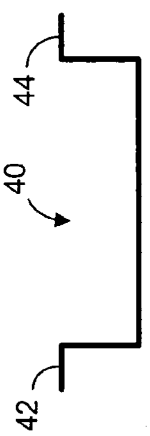
FIG. 12 shows a connection component for use with the OLED lighting modules of FIG. 11.
Figure 13A:
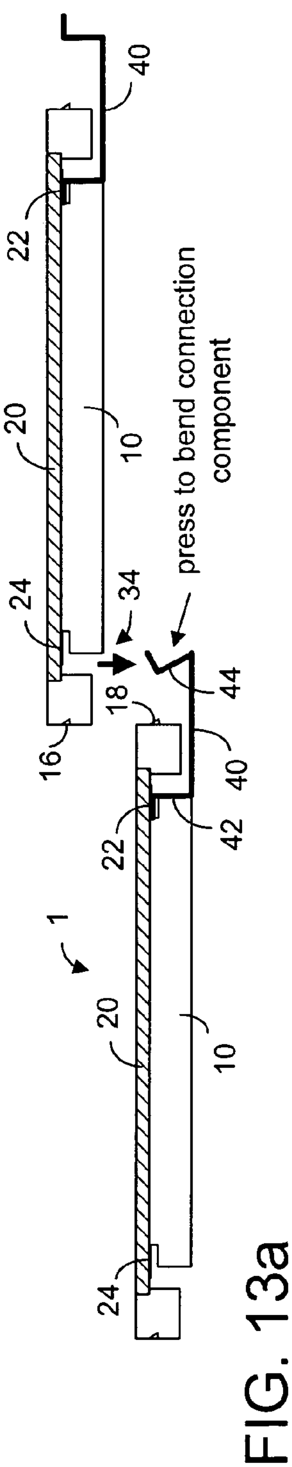
FIG. 13*a* shows how two OLED lighting modules of FIG. 11 are connected.

FIG. 13*a* shows how two OLED lighting modules as shown in FIG. 11 are connected together using a connection component 40 as shown in FIG. 12. As shown in FIG. 13*a*, the connection component 40 is already engaged with the OLED lighting module 1 and the bent portion 42 is in electrical contact with the electrode 22 of the OLED lighting module 1. In order to connect the connection 40 with an adjacent OLED lighting module 1', the bent portion 44 is pressed inward so that it can be lodged into the receptacle 34 of the OLED lighting module 1'.

Figure 13B:
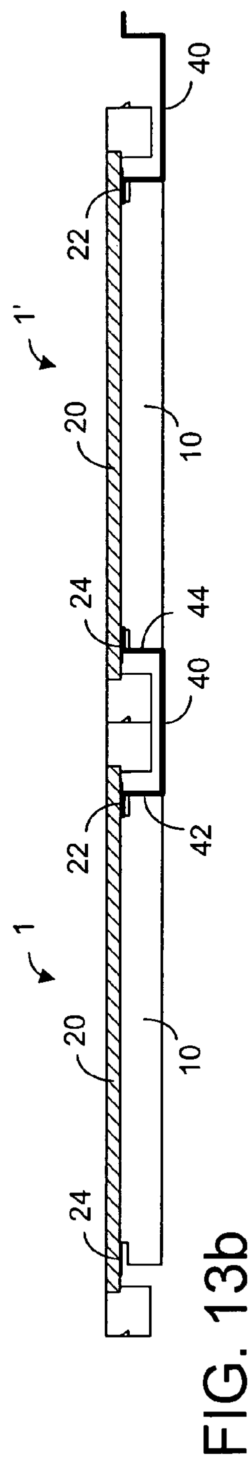
FIG. 13*b* shows two OLED lighting modules of FIG. 11 being properly connected.

FIG. 13*b* shows two OLED lighting modules being properly connected. As with FIG. 3*b*, the connection component 40 in FIG. 13*b* provides both the mechanical connection and the electrical connection between the connected OLED lighting modules 1 and 1'. As the bent portion 42 is in electrical contact with electrode 22 of the OLED lighting module 1 and the bent portion 44 is in electrical contact with electrode 24 of the OLED lighting module 1', the electrode 22 of the OLED lighting module 1 is electrically connected to the electrode 24 of the OLED lighting module 1'.

Figures 14A, 14B, 15:
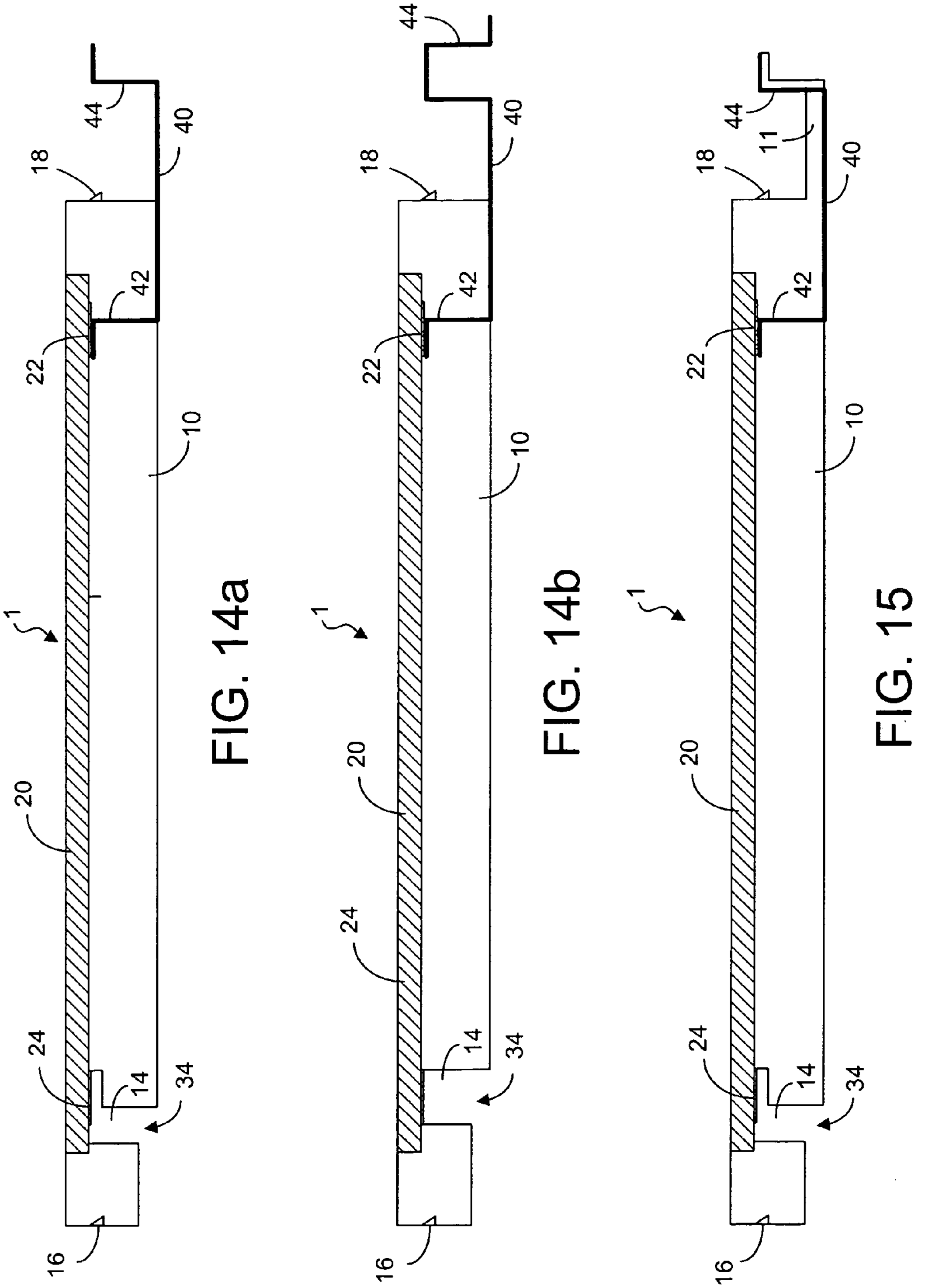

FIGS. 14*a*, 14*b* and 15 show three different embodiments of the present invention, as variations to the OLED lighting module and the connection component as shown in FIGS. 11 and 12. In the embodiment as shown in FIG. 14*a*, the connection component 40 is embedded in one end of the OLED lighting module 1. As such, the connection component 40 and the OLED lighting module 1 are integrated into one unit. The embodiment as shown in FIG. 14*b* is similar to FIG. 14*a* except that the opening 14 or the receptacle 34 does not have an inward extension portion. In order to match the shape of the opening 14 or receptacle 34, the bent portion 44 of the embedded connection component 40 is rectangular in shape. The embodiment as shown in FIG. 15 is also similar to FIG. 14*a* except that one end of the casing 10 has an extended part 11 to provide mechanical support for the bent portion 44 of the connection component 40. The extended part 11 is sufficiently flexible so as to allow the bent portion 44 to be pressed inward when two adjacent OLED modules are connected or disconnected.

Figure 16:
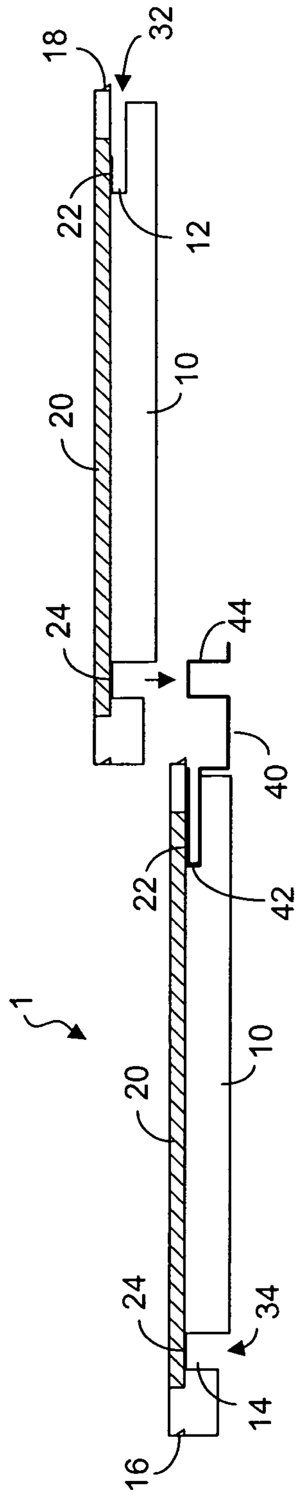

FIG. 16 shows yet another embodiment of the present invention. In this embodiment, the opening 12 or the receptacle 32 is provided on a side edge, instead of the bottom side of the casing 10. Accordingly, the first bent portion 42 of the connection component 40 is configured to be inserted into the opening 12 from the side of the casing 10.

Thus, although the present invention has been described with respect to one or more embodiments thereof, it will be understood by those skilled in the art that the foregoing and various other changes, omissions and deviations in the form and detail thereof may be made without departing from the scope of this invention.

What is claimed is:

1. A lighting module for use with at least one connection component, said lighting module comprising:
- an organic light-emitting diode lighting panel comprising a first electrode and a second electrode; and
- a casing comprising a first surface and an opposing second surface, the first surface configured for mounting the organic light-emitting diode panel, a first opening through the second surface for providing access to the first electrode and a second opening through the second surface for providing access to the second electrode, wherein the connection component made from a sheet of an electrically conductive material, the connection component comprising a first bent portion, a second bent portion, and a straight portion between the first bent portion and the second bent portion, the first bent portion dimensioned for inserting into the first opening to make electrical contact to the first electrode.

2. The lighting module according to claim 1, wherein the second bent portion is dimensioned to match the second opening.

3. The lighting module according to claim 1, wherein the casing further comprises a plurality of edges between the first surface and the second surface, the plurality of edges comprising:

a first pair of edges including a first side edge and an opposing second side edge; and a different second pair of edges including a third side edge and an opposing fourth side edge, wherein the second opening is adjacent to but spaced from the second side edge.

4. The lighting module according to claim 3, wherein the first opening is adjacent to and spaced from the first side edge.

5. The lighting module according to claim 4, wherein the organic lighting panel further comprises a third electrode and a fourth electrode, and the casing further comprises a third opening adjacent to and spaced from the third side edge for providing access to the third electrode; and a fourth opening adjacent to and spaced from the fourth side edge for providing access to the fourth electrode.

6. The lighting module according to claim 5, further comprising a second connection component made from a sheet of an electrically conductive material, the second connection component comprising a first bent portion and a second bent portion, the first bent portion dimensioned for inserting into the third opening to make electrical contact to the third electrode.

7. The lighting module according to claim 4, wherein the casing has a first engagement member on the first side edge and a complement second engagement member on the second side edge, and wherein the first engagement member and the second engagement member comprise a tenon and a matching mortise.

8. The lighting module according to claim 1, wherein the casing further comprises a first side edge and an opposing side edge between the first surface and the second surface, wherein the first opening is adjacent to and spaced from the first side edge by a first length, and the second opening is adjacent to and spaced from the second side edge by a second length substantially equal to the first length, and wherein the first electrode and the second electrode are located within the casing between the first surface and the second surface.

9. The lighting module according to claim 1, wherein the casing further comprises a first side edge and an opposing side edge between the first surface and the second surface, wherein the first opening is adjacent to and spaced from the first side edge by a first separation distance, and the second opening is adjacent to and spaced from the second side edge by a second separation distance, such that when the first bent portion is inserted into the first opening, a first part of the straight portion is in the proximity of the second surface between the first opening and the first side edge, and a second part of the straight portion is extending outward from the first side edge such that the second bent portion is spaced from the first side edge by a length substantially equal to the second separation distance.

10. The lighting module according to claim 1, wherein the first electrode and the second electrode form a pair of anode and cathode for providing electrical current to the organic light-emitting diode lighting panel.

11. The lighting module according to claim 1, wherein the casing further comprises a plurality of edges between the first surface and the second surface, the plurality of edges comprising a first side edge and an opposing second side edge, wherein the first opening is adjacent to and spaced from the first side edge, and the second opening is located on the second surface adjacent to the second side edge.

12. A lighting assembly comprising:

a first lighting module;

an adjacent second lighting module; and a connection component made from a sheet of an electrically conductive material for providing a connection between the first lighting module and the second lighting module, wherein each of the first lighting module and the second lighting comprises:

an organic light-emitting diode lighting panel comprising a first electrode and a second electrode, and a casing comprising a first surface and an opposing second surface, the first surface configured for mounting the organic light-emitting diode panel, a first opening through the second surface for providing access to the first electrode and a second opening through the second surface for providing access to the second electrode, and wherein the connection component comprises a first bent portion, a second bent portion, and a straight portion between the first bent portion and the second bent portion, the first bent portion dimensioned for inserting into the first opening of the first lighting module to make electrical contact to the first electrode in the first lighting module, the second bent portion dimensioned for inserting into the second opening of the second lighting module to make electrical contact to the second electrode in the second lighting module.

13. The lighting assembly according to claim 12, wherein the casing further comprises a first side edge and an opposing side edge between the first surface and the second surface, and wherein the first electrode and the second electrode are located within the casing between the first surface and the second surface, and wherein the first opening is adjacent to and spaced from the first side edge by a first separation distance and the second opening is adjacent to and spaced from the second side edge by a second separation distance, such that when the first bent portion is inserted into the first opening of the first lighting module, a first part of the straight portion is in the proximity of the second surface of the first lighting module, and a second part of the straight portion is in the proximity of the second surface of the second lighting module such that the second bent portion is spaced from the first side edge of the first lighting module by a length substantially equal to the second separation distance in the second lighting module.

14. The lighting assembly according to claim 13, wherein the casing further comprises a plurality of engaging members for mechanically coupling the first side edge of the first lighting module to the second side edge of the second lighting module.

15. The lighting assembly according to claim 14, wherein the engaging members comprise mortises and matching tenons.

16. The lighting assembly according to claim 12, further comprising:

a third lighting module; and a second connection component made of electrically conductive material for providing a connection between the second lighting module and the third lighting module.

17. The lighting assembly according to claim 12, wherein the organic light-emitting diode lighting panel further comprises a third electrode and a fourth electrode, and the second surface further comprises a third opening for providing access to the third electrode and a fourth opening for providing access to the fourth electrode, and wherein the casing further comprises a plurality of edges between the first surface and the second side surface, the plurality of edges comprising:

a first pair of edges including a first side edge and an opposing side edge; and a different second pair of edges including a third side edge and an opposing fourth side edge, wherein the first opening is adjacent to and spaced from the first side edge, the second opening is adjacent to and spaced from the second side edge, the third opening is adjacent to and spaced from the second side edge, and the fourth opening is adjacent to and spaced from the fourth side edge, said lighting assembly further comprising:

a third lighting module; and a second, connection component made of an electrically conductive material for providing a connection between the first lighting module and the third lighting module, wherein the third lighting module also comprises:

an organic light-emitting diode lighting panel comprising a first electrode and a second electrode, and a casing comprising a first surface and an opposing second surface, the first surface configured for mounting the organic light-emitting diode panel, the second surface comprising a first opening for providing access to the first electrode and a second opening for providing access to the second electrode, and wherein the second connection component comprises:

a first bent portion dimensioned for inserting into the third opening of the first lighting module to make electrical contact to the third electrode in the first lighting module; and a second bent portion dimensioned for inserting into the second opening of the third lighting module to make electrical contact to the second electrode in the third lighting module.

18. The lighting assembly according to claim 17, further comprising:

a fourth lighting module; and a third connection component made of an electrically conductive material for providing a connection between the second lighting module and the fourth lighting module, wherein the fourth lighting module also comprises:

an organic light-emitting diode lighting panel comprising a first electrode and a second electrode, and a casing comprising a first surface and an opposing second surface, the first surface configured for mounting the organic light-emitting diode panel, the second surface comprising a first opening for providing access to the first electrode and a second opening for providing access to the second electrode, and wherein the third connection component comprises:

a first bent portion dimensioned for inserting into the third opening of the second lighting module to make electrical contact to the third electrode in the second lighting module; and a second bent portion dimensioned for inserting into the second opening of the fourth lighting module to make electrical contact to the second electrode in the fourth lighting module.

19. A method for assembling a plurality of lighting modules, each lighting module comprising:

an organic light-emitting diode lighting panel comprising a first electrode, and a second electrode; and a casing comprising a first surface, an opposing second surface and a plurality of edges between the first surface and the second surface, the plurality of edges comprise a first pair of side edges including a first side edge and an opposing second side edge, and a different second pair of second side edges including a third side edge and a fourth side edge, the first surface configured for mounting the organic light-emitting diode panel, wherein the first electrode and the second electrode are located within the casing between the first surface and the second surface, the second surface comprising: a first opening through the second surface for providing access to the first electrode, and a second opening through the second surface for providing access to the second electrode, wherein each of the lighting modules is located adjacent to at least one another lighting module, said method comprising:

providing a connection component made from a sheet of an electrically conductive material between two adjacent :lighting modules, the two adjacent lighting modules include a first lighting module and a second lighting module, the connection component comprising a first bent portion, a second bent portion and a straight portion between the first bent portion and the second bent portion, the first bent portion dimensioned to match the first opening and the second bent portion dimensioned to match the second opening;

inserting the first bent portion into the first opening of the first lighting module to make electrical contact to the first electrode in the first lighting module; and inserting the second bent portion into the second opening of the second lighting module to make electrical contact to the second electrode in the second lighting module.

20. The method according to claim 19, wherein the organic light-emitting diode lighting panel in each lighting module further comprises a third electrode and a fourth electrode; and the second surface of the casing in each lighting module further comprises: a third opening for providing access to the third electrode, and a fourth opening for providing access to the fourth electrode, wherein a third lighting module in said plurality of lighting modules is also located adjacent to the first lighting module, said method further comprising:

providing a second connection component made of an electrically conductive material between the first lighting module and a third lighting module, the second connection component comprising a first bent portion and a second bent portion separated by a straight portion, the first bent portion dimensioned to match the first opening and the second bent portion dimensioned to match the second opening;

inserting the first bent portion of the second connection component into the third opening of the first lighting module to make electrical contact to the third electrode in the first lighting module; and inserting the second bent portion of the second connection component into the fourth opening of the third lighting module to make electrical contact to the fourth electrode in the third lighting module.

* * * * *